United States Patent
Hong

(10) Patent No.: US 11,064,415 B2
(45) Date of Patent: Jul. 13, 2021

(54) WIRELESS COMMUNICATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/604,955

(22) PCT Filed: Jun. 30, 2017

(86) PCT No.: PCT/CN2017/091263
§ 371 (c)(1),
(2) Date: Oct. 11, 2019

(87) PCT Pub. No.: WO2019/000431
PCT Pub. Date: Jan. 3, 2019

(65) Prior Publication Data
US 2020/0059845 A1 Feb. 20, 2020

(51) Int. Cl.
*H04W 36/30* (2009.01)
*H04W 36/00* (2009.01)
(Continued)

(52) U.S. Cl.
CPC ..... *H04W 36/30* (2013.01); *H04W 36/00837* (2018.08); *H04W 36/08* (2013.01); *H04W 36/385* (2013.01)

(58) Field of Classification Search
CPC ........... H04W 36/30; H04W 36/00837; H04W 36/08; H04W 36/385; H04W 36/38;
(Continued)

(56) References Cited

U.S. PATENT DOCUMENTS

2015/0131462 A1* 5/2015 Puranik ............. H04W 52/0216
370/252
2015/0271749 A1* 9/2015 Lu .......................... H04W 76/11
455/437

(Continued)

FOREIGN PATENT DOCUMENTS

CN        101370286 A    2/2009
CN        101668312 A    3/2010
(Continued)

OTHER PUBLICATIONS

International Search (including English translation) and Written Opinion issued in PCT/CN2017/091263, dated Feb. 24, 2018, (8p).

(Continued)

*Primary Examiner* — Marisol Figueroa
(74) *Attorney, Agent, or Firm* — Arch & Lake LLP

(57) ABSTRACT

A wireless communication method, includes: acquiring network information of a cellular communication network perceived by a wireless access point (AP), wherein the network information is configured to indicate a type of the cellular communication network; transmitting the network information to a terminal; and receiving a connection establishment request transmitted by the terminal, wherein the connection establishment request is transmitted when an intersection between the type of the cellular communication network indicated by the network information and a type of a cellular communication network supported by the terminal exists.

20 Claims, 8 Drawing Sheets

(51) Int. Cl.
  *H04W 36/08* (2009.01)
  *H04W 36/38* (2009.01)
(58) Field of Classification Search
  CPC . H04W 36/14; H04W 36/0022; H04W 84/12; H04W 48/18; H04W 36/0055; H04W 76/10
  See application file for complete search history.

(56) References Cited

U.S. PATENT DOCUMENTS

| | | | |
|---|---|---|---|
| 2016/0316410 A1* | 10/2016 | Tan | H04B 1/3816 |
| 2017/0208538 A1* | 7/2017 | Cao | H04W 48/16 |
| 2018/0167861 A1* | 6/2018 | Kavoussi | H04W 36/14 |
| 2019/0261232 A1* | 8/2019 | Mestanov | H04W 36/0022 |

FOREIGN PATENT DOCUMENTS

| | | |
|---|---|---|
| CN | 102958121 A | 3/2013 |
| CN | 103037469 A | 4/2013 |
| CN | 103476079 A | 12/2013 |
| CN | 104955124 A | 9/2015 |
| CN | 106604356 A | 4/2017 |
| EP | 2061269 A1 | 5/2009 |
| WO | 2014121599 A1 | 8/2014 |
| WO | 2015131530 A1 | 9/2015 |

OTHER PUBLICATIONS

First Office Action of Chinese Application No. 201780000547.3 dated Aug. 5, 2020 with English translation, (15p).
Second Office Action of Chinese Application No. 201780000547.3 dated Mar. 8, 2021 with English translation, (13p).

* cited by examiner the terminal receives network information transmitted by an AP, wherein the network information is configured to indicate a type of the cellular communication network perceived by the AP    201 when an intersection between the type of the cellular communication network indicated by the network information and a type of a cellular communication network supported by the terminal exists, the terminal transmits a connection establishment request to the AP, wherein the connection establishment request is configured to instruct the AP to establish a communication connection with the terminal.    202

FIG. 2

WIRELESS COMMUNICATION METHOD AND APPARATUS

CROSS-REFERENCE TO RELATED APPLICATION

This application is a national stage of international Application No. PCT/CN2017/091263 filed on Jun. 30, 2017. The disclosures of these applications are incorporated herein by reference in their entirety.

TECHNICAL FIELD

The present disclosure relates to the field of mobile communication technologies, and in particular, to a communication method and apparatus.

BACKGROUND

With the development of science and technology, a wireless local area network and a cellular communication network have become increasingly common in people's daily life. At present, many terminals may support both the wireless local area network and the cellular communication network, and also support switching between the cellular communication network and the wireless local area network.

SUMMARY

In order to solve the problems in the background, the embodiments of the present disclosure provide a communication method and apparatus. The technical solutions are as follows.

According to a first aspect of the present disclosure, there is provided a wireless communication method, comprising:

acquiring network information of a cellular communication network perceived by a wireless access point (AP), wherein the network information is configured to indicate a type of the cellular communication network;

transmitting the network information to a terminal; and receiving a connection establishment request transmitted by the terminal, wherein the connection establishment request is transmitted when an intersection between the type of the cellular communication network indicated by the network information and a type of a cellular communication network supported by the terminal exists.

For example, wherein the transmitting the network information to the terminal comprises:

transmitting a management frame to the terminal, wherein the management frame carries the network information.

For example, further comprising:

determining, when a network switching is required, candidate cellular communication networks within an intersection between the type of the cellular communication network detected by the wireless access point and the type of a cellular communication network supported by the terminal;

determining a target cellular communication network in the candidate cellular communication networks; and transmitting a network switching instruction to the terminal, wherein the network switching instruction is configured to instruct the terminal to switch to the target cellular communication network from the wireless local area network.

For example, further comprising:

acquiring a communication quality of the wireless local area network that the AP connects; and determining that network switching is required when the communication quality of the wireless local area network is lower than a first quality threshold.

For example, wherein acquiring a communication quality of the wireless local area network that the AP connects comprises:

acquiring a communication quality of the wireless local area network that the AP connects based on at least one of: a packet loss rate of data transmission between the AP and the terminal, a packet error rate of the data transmission between the AP and the terminal, and a current communication load of the AP.

For example, wherein the determining the target cellular communication network in the candidate cellular communication network comprises:

acquiring a communication quality of each cellular communication network of the candidate cellular communication networks;

determining, in the candidate cellular communication networks, any one cellular communication network having a communication quality greater than a second quality threshold as the target cellular communication network; or, determining, in the candidate cellular communication networks, a cellular communication network having the highest communication quality and the communication quality greater than a second quality threshold as the target communication network.

For example, wherein the acquiring a communication quality of each cellular communication network of the candidate cellular communication networks comprises:

determining the communication quality of each cellular communication network of the candidate cellular communication networks based on signal strength of the each cellular communication network.

For example, wherein the network information comprises a mode of the cellular communication network, and the network information further comprises at least one of an identifier of a base station and a load of the base station.

For example, wherein the network system comprises a GSM network mode, a CDMA network mode, a CDMA2000 network mode, a WCDMA network mode, a TD-SCDMA network mode, a TD-LTE network mode, or a FDD-LTE network mode.

According to a second aspect of the present disclosure, there is provided a wireless communication method, comprising:

receiving network information transmitted by a wireless access point (AP), wherein the network information is configured to indicate a type of the cellular communication network perceived by the AP; and transmitting a connection establishment request to the AP when an intersection between the type of the cellular communication network indicated by the network information and a type of a cellular communication network supported by the terminal exists, wherein the connection establishment request is configured to instruct the AP to establish a communication connection with the terminal.

For example, wherein the receiving the network information transmitted by the AP comprises:

receiving a management frame transmitted by the AP, wherein the management frame carries the network information.

For example, further comprising:

receiving a network switching instruction transmitted by the AP, wherein the network switching instruction is configured to instruct the terminal to switch to a target cellular communication network from a wireless local area network, wherein the target cellular communication network is a cellular communication network of the candidate cellular communication networks, the candidate cellular communication networks are an intersection of the cellular communication network perceived by the AP and the cellular communication network supported by the terminal;

switching, after receiving the network switching instruction, to the target cellular communication network from the wireless local area network.

For example, wherein the network information comprises a network mode of the cellular communication network, and the network information further comprises at least one of an identifier of a base station and a load of the base station.

For example, wherein the network system comprises a GSM network mode, a CDMA network mode, a CDMA2000 network mode, a WCDMA network mode, a TD-SCDMA network mode, a TD-LTE network mode or a FDD-LTE network mode.

According to a third aspect of the present disclosure, there is provided a wireless access point, comprising:

a first acquisition module, which is configured to acquire network information of a cellular communication network perceived by the wireless access point (AP), wherein the network information is configured to indicate a type of the cellular communication network;

a transmission module, which is configured to transmit the network information to a terminal; and a reception module, which is configured to receive a connection establishment request transmitted by the terminal, wherein the connection establishment request is transmitted by the terminal when an intersection between the type of the cellular communication network indicated by the network information and a type of a cellular communication network supported by the terminal exists.

For example, wherein the transmission module is configured to:

transmitting a management frame to the terminal, wherein the management frame carries the network information.

For example, wherein the wireless access point further comprises:

a first determination module, which is configured to determine, in a cellular communication network perceived by the AP, a candidate cellular communication network a type of which has an intersection with a type, which is supported by the terminal, of a cellular communication network when network switching is required;

a second determination module, which is configured to determine a target cellular communication network in the candidate cellular communication network; and a transmission module, which is configured to transmit a network switching instruction to the terminal, wherein the network switching instruction is configured to instruct the terminal to be switched to the target cellular communication network from the wireless local area network.

For example, further comprising:

a second acquisition module, which is configured to acquire a communication quality of a wireless local area network that the AP connects; and the first determination module, which is further configured to determine that network switching is required when the communication quality of the wireless local area network is lower than a first quality threshold.

For example, wherein the second acquisition module is configured to:

determine a communication quality of the wireless local area network that the AP connects based on at least one of a packet loss rate of data transmission between the AP and the terminal, a packet error rate of the data transmission between the AP and the terminal, and a current communication load of the AP.

For example, wherein the second determination module is configured to:

acquire a communication quality of each cellular communication network of the candidate cellular communication networks;

determine, in the candidate cellular communication networks, any one cellular communication network having a communication quality greater than a second quality threshold as the target cellular communication network;

or, determine, in the candidate cellular communication networks, the cellular communication network having the highest communication quality and a communication quality greater than a second quality threshold as the target communication network.

For example, wherein the second determination module is configured to:

determine the communication quality of the corresponding cellular communication network based on the strength of a communication signal of each cellular communication network of the candidate cellular communication networks.

For example, wherein the network information comprises a network mode of the cellular communication network, and the network information further comprises at least one of an identifier of a base station and a load of the base station.

For example, wherein the network mode comprises a GSM network mode, a CDMA network mode, a CDMA2000 network mode, a WCDMA network mode, a TD-SCDMA network mode, a TD-LTE network mode or a FDD-LTE network mode.

According to a fourth aspect of the present disclosure, there is provided a terminal, comprising:

an information reception module, which is configured to receive network information transmitted by the wireless access point (AP), wherein the network information is configured to indicate a type of the cellular communication network perceived by the AP;

a transmission module, which is configured to transmit a connection establishment request to the AP when there is an intersection between a type, which is indicated by the network information, of the cellular communication network and a type of a cellular communication network supported by the terminal, wherein the connection establishment request is configured to instruct the AP to establish a communication connection with the terminal.

For example, wherein the information reception module is configured to:

receive a management frame transmitted by the AP, wherein the management frame carries the network information.

For example, further comprising:

an instruction reception module, which is configured to receive a network switching instruction transmitted by the AP, wherein the network switching instruction is configured to instruct the terminal to be switched to a target cellular communication network from a wireless local area network, the target cellular communication network is a cellular communication network of the candidate cellular communication networks, and the candidate cellular communication networks are an intersection of the cellular communication network perceived by the AP and the cellular communication network supported by the terminal; and a switching module, which is configured to switch the terminal to the target cellular communication network from the wireless local area network after receiving the network switching instruction.

For example, wherein the network information comprises a network mode of the cellular communication network, and the network information further comprises at least one of an identifier of a base station and a load of the base station.

For example, wherein the network system comprises a GSM network mode, a CDMA network mode, a CDMA2000 network mode, a WCDMA network mode, a TD-SCDMA network mode, a TD-LTE network mode or a FDD-LTE network mode.

According to a fifth aspect of the present disclosure, there is provided a wireless access point, comprising:
a processor;
a memory, which is configured to store an instruction executable by the processor;
wherein the processor is configured to:
acquire network information of a cellular communication network perceived by a wireless access point (AP), wherein the network information is configured to indicate a type of the cellular communication network;
transmit the network information to a terminal; and
receive a connection establishment request transmitted by the terminal, wherein the connection establishment request is transmitted when an intersection between the type of the cellular communication network indicated by the network information and a type of a cellular communication network supported by the terminal exists.

For example, wherein the transmitting the network information to the terminal comprises:
transmitting a management frame to the terminal, wherein the management frame carries the network information.

For example, wherein the processor is further configured to:
determining candidate cellular communication networks within an intersection between the type of the cellular communication network detected by the wireless access point and the type of a cellular communication network supported by the terminal;
determining a target cellular communication network in the candidate cellular communication networks; and
transmitting a network switching instruction to the terminal, wherein the network switching instruction is configured to instruct the terminal to switch to the target cellular communication network from the wireless local area network.

For example, wherein the processor is further configured to:
acquiring a communication quality of the wireless local area network that the AP connects; and
determining that network switching is required when the communication quality of the wireless local area network is lower than a first quality threshold.

For example, wherein acquiring a communication quality of the wireless local area network that the AP connects comprises:
acquiring a communication quality of the wireless local area network that the AP connects based on at least one of: a packet loss rate of data transmission between the AP and the terminal, a packet error rate of the data transmission between the AP and the terminal, and a current communication load of the AP.

For example, wherein the determining the target cellular communication network in the candidate cellular communication network comprises:
acquiring a communication quality of each cellular communication network of the candidate cellular communication networks;
determining, in the candidate cellular communication networks, any one cellular communication network having a communication quality greater than a second quality threshold as the target cellular communication network; or,
determining, in the candidate cellular communication networks, a cellular communication network having the highest communication quality and the communication quality greater than a second quality threshold as the target communication network.

For example, wherein the acquiring a communication quality of each cellular communication network of the candidate cellular communication networks comprises:
determining the communication quality of each cellular communication network of the candidate cellular communication networks based on signal strength of the each cellular communication network.

For example, wherein the network information comprises a mode of the cellular communication network, and the network information further comprises at least one of an identifier of a base station and a load of the base station.

According to a sixth aspect of the present disclosure, there is provided a terminal, comprising:
a processor;
a memory, which is configured to store an instruction executable by the processor;
wherein the processor is configured to:
receive network information transmitted by the wireless access point (AP), wherein the network information is configured to indicate a type of a cellular communication network perceived by the AP; and
transmit a connection establishment request to the AP when there is an intersection between the type, which is indicated by the terminal, of the cellular communication network and a type of a cellular communication network supported by the terminal, wherein the connection establishment request is configured to instruct the AP to establish a communication connection with the terminal.

According to a seventh aspect of the present disclosure, there is provided a non-transitory computer-readable storage medium, wherein a computer program is stored in the computer-readable storage medium, and the stored computer program may implement the wireless communication method according to any one of claims 1 to 9 when being executed by a processor;
or, the stored computer program can implement the wireless communication method according to any one of claims 10 to 14 when being executed by a processor.

It is to be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 2 illustrates a flowchart of a wireless communication method according to embodiments of the present disclosure.

DETAILED DESCRIPTION

The present disclosure ill be described in further detail with reference to the accompanying drawings, to present the objects, technical solutions, and advantages of the present disclosure more clearly.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

In the related art, the terminal may be switched to the cellular communication network from the wireless local area network under the control of a user, or may be switched to the cellular communication network when a data transmission rate of the wireless local area network is small.

However, in the related art, the terminal often cannot obtain information of the cellular communication network before network switching, which may cause the terminal to perform invalid network switching, that is, there may be a case where data transmission may not be performed through the cellular communication network after the terminal is switched to the cellular communication network from the wireless local area network, and therefore the reliability of network switching in the related art is poor.

Figure 1A:
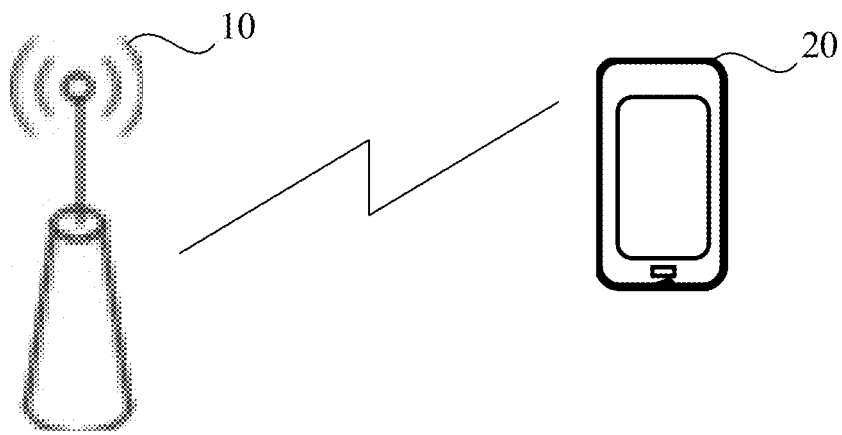
FIG. 1A illustrates a schematic diagram of an implementation environment according to embodiments of the present disclosure.

FIG. 1A illustrates a schematic diagram of an implementation environment according embodiments of the present disclosure. As shown in FIG. 1A, the implementation environment may include an AP (Wireless Access Point) 10 and a terminal 20. The terminal 20 and the AP 10 may establish a communication connection over at least one of a wireless local area network and a cellular communication network.

The AP 10 is an access point for a mobile user to access a wired network, and may be deployed in a house, inside of a building, and inside of a campus, with a typical coverage radius of several tens of meters to hundreds of meters. Certainly, the AP 10 may further be deployed outdoors.

The terminal 20 may be a mobile phone, a tablet, a smart TV, a smart wearable device, an in-vehicle communication device, a computer, and the like.

Figure 1B:
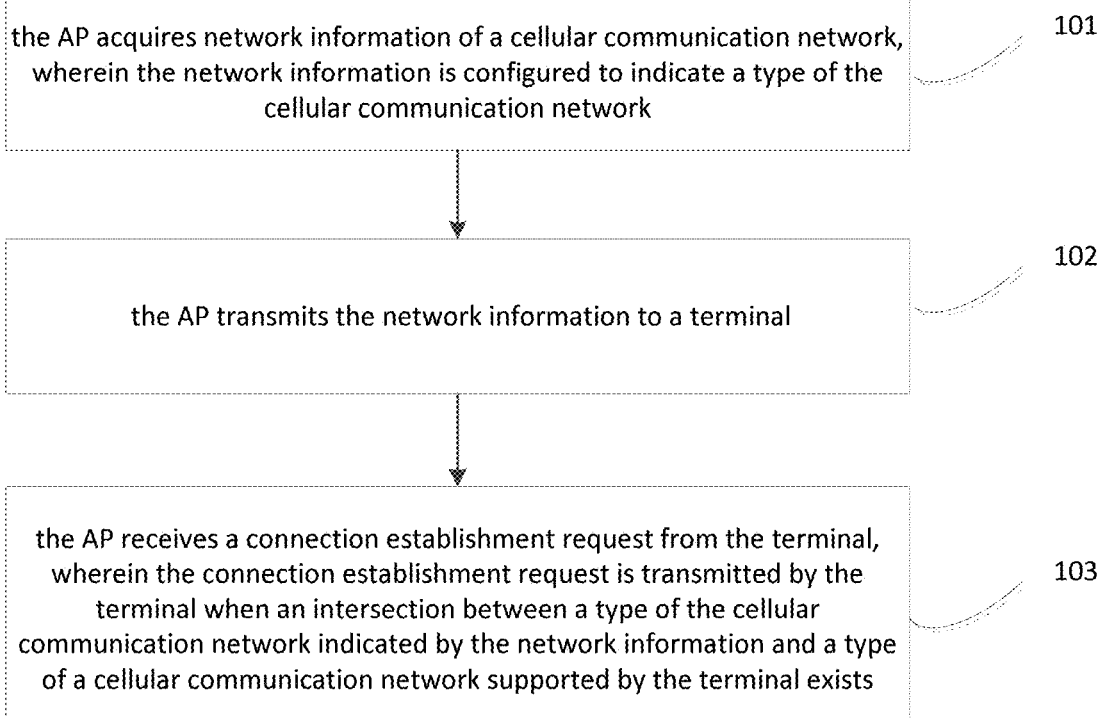
FIG. 1B illustrates a flowchart of a wireless communication method according to embodiments of the present disclosure.

FIG. 1B illustrates a flowchart of a wireless communication method according to embodiments of the present disclosure. As shown in FIG. 1B, the wireless communication method is adopted in an AP shown in FIG. 1A, and includes the following steps.

Step 101, the AP acquires network information of a cellular communication network, wherein the network information is configured to indicate a type of the cellular communication network.

Step 102, the AP transmits the network information to a terminal.

Step 103, the AP receives a connection establishment request from the terminal, wherein the connection establishment request is transmitted by the terminal when an intersection between a type of the cellular communication network indicated by the network information and a type of a cellular communication network supported by the terminal exists.

In summary, the wireless communication method provided by embodiments of the present disclosure includes the following steps: the network information of the cellular communication network perceived by the wireless access point is transmitted to the terminal by the wireless access point, wherein the network information may indicate the type of the cellular communication network perceived by the wireless access point, so that the terminal can determine the type of the cellular communication network detectable by the wireless access point according to the network information; and the wireless access point which supports a type of a cellular communication network within an intersection between the type of the cellular communication network detected by the wireless access point and the type of the cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

FIG. 2 illustrates a flowchart of a wireless communication method according to embodiments of the present disclosure. As shown in FIG. 2, the wireless communication method is adopted in a terminal shown in FIG. 1A, and includes the following steps.

In step 201, the terminal receives network information transmitted by an AP, wherein the network information is configured to indicate a type of the cellular communication network perceived by the AP.

In step 202, when an intersection between the type of the cellular communication network indicated by the network information and a type of a cellular communication network supported by the terminal exists, the terminal transmits a connection establishment request to the AP, wherein the connection establishment request is configured to instruct the AP to establish a communication connection with the terminal.

In summary, the wireless communication method provided by embodiments of the present disclosure includes the following steps: the network information of the cellular communication network perceived by the wireless access point is transmitted from the wireless access point to the terminal, wherein the network information may indicate the type of the cellular communication network perceived by the wireless access point, so that the terminal may determine the type of the cellular communication network detectable by the wireless access point according to the network information; and the wireless access point which supports a type of a cellular communication network within an intersection between the type of the cellular communication network detected by the wireless access point and the type of the cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

Figure 3:
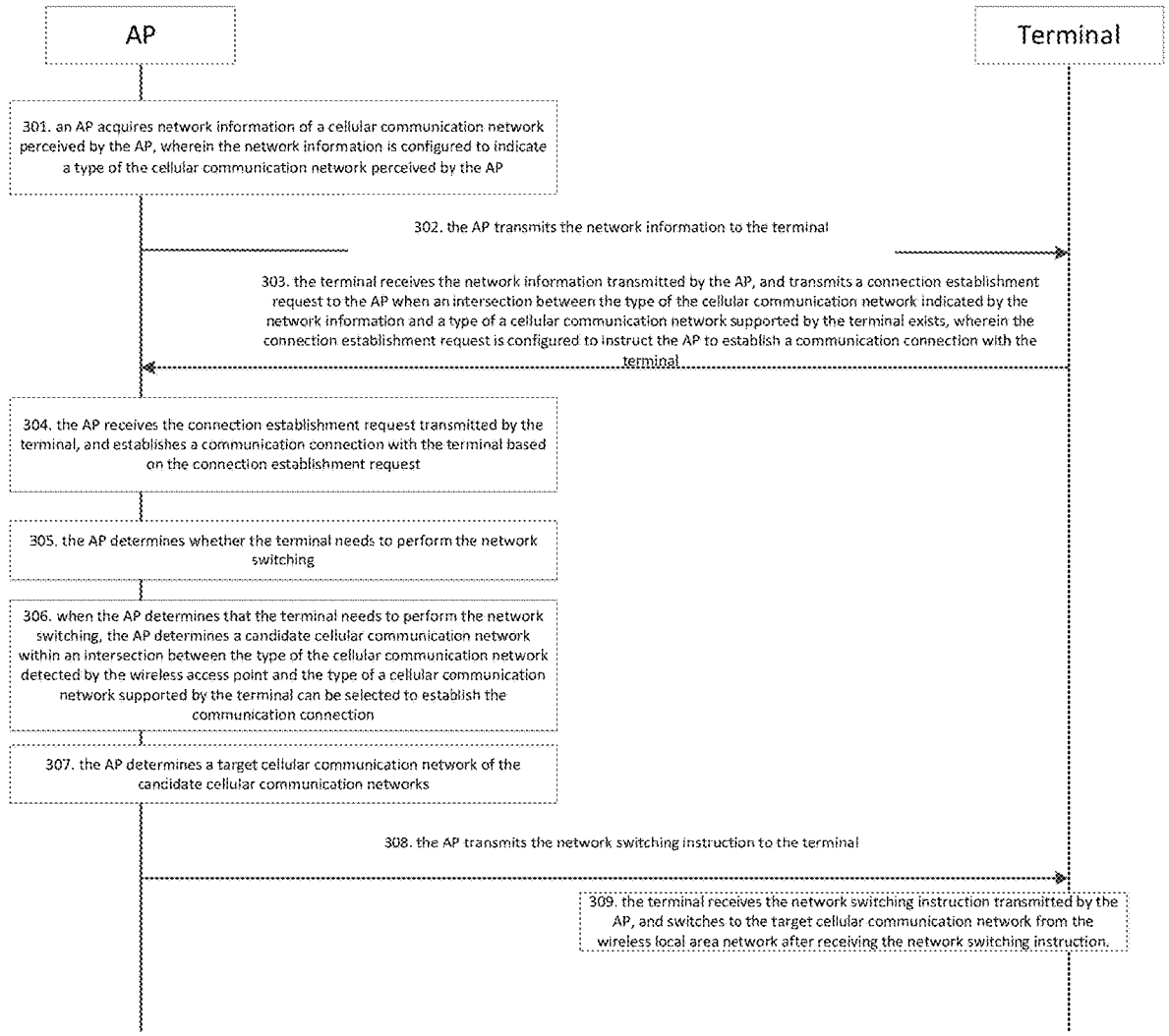
FIG. 3 illustrates a flowchart of a wireless communication method according to embodiments of the present disclosure.

FIG. 3 illustrates a flowchart of a wireless communication method according to embodiments of the present disclosure. As shown in FIG. 3, the wireless communication method includes the following steps.

In step 301, an AP acquires network information of a cellular communication network perceived by the AP, wherein the network information is configured to indicate a type of the cellular communication network perceived by the AP.

It should be noted that the network information may include a network mode of the cellular communication network, wherein the network mode may be a GSM (Global System for Mobile Communication) network mode, a CDMA (Code Division Multiple Access) network mode, a CDMA2000 network mode, a WCDMA (Wideband Code Division Multiple Access) network mode, a TD-SCDMA (Time Division-Synchronous Code Division Multiple Access) network mode, a TD-LTE (Time Division Long Term Evolution) network mode or a FDD-LTE (Frequency Division Dual) network mode, and the like. Certainly, in a practical application, it may further include other network modes which are not specifically limited in the embodiment of the present disclosure. In addition, the network information may further include at least one of an identifier of a base station and a load of the base station. It should be noted that the network information may include other contents in addition to the network mode, the identifier of the base station, and the load of the base station, which are not specifically limited in the embodiment of the present disclosure.

In embodiments of the present disclosure, the AP may access a core network of the cellular communication network, and may perceive the network information of the cellular communication network through the core network. Alternatively, the AP may include a radio frequency component. The AP may perceive a network signal of the cellular communication network by the radio frequency component, and acquire the network information of the cellular communication network based on the network signal. Certainly, in a practical application, the AP may acquire the network information of the cellular communication network by other manners, which will be omitted herein by embodiments of the present disclosure.

It should be noted that the "cellular communication network perceived by an AP" described above refers to a cellular communication network detectable by an AP. In a practical application, the AP may only acquire network information of a cellular communication network having a strength of a communication signal greater than a certain threshold in the perceived cellular communication networks, which is not specifically limited in the embodiment of the present disclosure.

In step 302, the AP transmits the network information to the terminal.

In a practical application, the AP transmits a management frame to the terminal, wherein the management frame may carry the network information. The management frame refers to a frame configured to manage a connection in the wireless local area network. The management frame may include a beacon frame, a probe response frame, an association response frame, an authentication response frame, a reassociation response frame, and the like. In one embodiment of the present disclosure, the network information may be carried in the beacon frame, the probe response frame and the association response frame in the management frame, or other types of management frames, wherein the beacon frame is periodically broadcast by the AP, and configured to enable the terminal to obtain existence of the wireless local area network after receiving the beacon frame. The probe response frame is a data frame transmitted by the AP to the terminal after receiving a probe request frame transmitted by the terminal. The probe request frame is configured to instruct the AP meeting a certain parameter to return the probe response frame to the terminal. The association response frame is a data frame that the AP transits to the terminal when the terminal attempts to associate with the AP. In one embodiment of the present disclosure, the network information may be carried in a MBO capability indication attribute (Multiband Operation AP Capability Indication Attribute) in the beacon frame, the probe response frame, or the association response frame, wherein the MBO capability indication attribute is configured to indicate whether the AP may perceive the cellular communication network or not.

In step 303, the terminal receives the network information transmitted by the AP, and transmits a connection establishment request to the AP when an intersection between the type of the cellular communication network indicated by the network information and a type of a cellular communication network supported by the terminal exists, wherein the connection establishment request is configured to instruct the AP to establish a communication connection with the terminal.

The type of the cellular communication network indicated by the network information is the type of the cellular communication network detectable by the AP, and therefore, when an intersection between the type of the cellular communication network indicated by the network information and the type of the cellular communication network supported by the terminal exits, the terminal may transmit a connection establishment request to the AP to establish a communication connection with the AP, in this way, when the terminal needs to perform the network switching network switching subsequently, the AP may, according to the information of the detected cellular communication network (for example, information of communication quality of the cellular communication network), determine whether the terminal may perform data transmission normally through the cellular communication network or not after being switched to the cellular communication network, and control the terminal to perform the network switching after determining that the terminal may perform data transmission normally through the cellular communication network after being switched to the cellular communication network, thereby ensuring that the terminal may smoothly perform data transmission after the network switching, and further improving the reliability of performing network switching on the terminal.

For example, if the type of the cellular communication indicated by the network information is CDMA and TD-LTE, the type of the cellular communication network supported by the terminal is TD-LTE, an intersection "TD-LTE" between "CDMA and TD-LTE" and "TD-LTE" exists. Accordingly, the terminal may transmit a connection establishment request to the AP transmitting the network information. Then, when the terminal needs to perform the network switching, the AP may first obtain information of the TD-LTE cellular communication network, and determine, according to the information, whether the terminal could perform data communication through the TD-LTE cellular communication network after switching to the TD-LTE cellular communication network. When the AP determines that the terminal may perform data communication through the TD-LTE cellular communication network after switching switched to the TD-LTE cellular communication network, the AP may control the terminal to perform the network switching.

In step 304, the AP receives the connection establishment request transmitted by the terminal, and establishes a communication connection with the terminal based on the connection establishment request.

In a practical application, the AP may record information such as the identifier of the terminal carried in the connection request after receiving the connection establishment request transmitted by the terminal, thereby establishing a communication connection with the terminal. Alternatively, the AP may transmit a connection establishment response to the terminal after receiving the connection establishment request transmitted by the terminal, so that the terminal establishes the communication connection with the AP after receiving the connection establishment response. A technical process of establishing the communication connection between the AP and the terminal is not specifically limited in the embodiment of the present disclosure.

In step 305, the AP determines whether the terminal needs to perform the network switching.

In some embodiments of the present disclosure, the AP may periodically determine whether the terminal needs to be subjected to network switching after establishing the communication connection with the terminal, wherein a technical process that the AP may determine whether the terminal needs to perform the network switching may be as follows:

The AP acquires a communication quality of the wireless local area network that the AP connects. When the communication quality is lower than a first quality threshold, the AP determines that the terminal needs to perform the network switching. In a practical application, when the communication quality of the wireless local area network is poor, the efficiency of performing data transmission by the terminal through the wireless local area network becomes low. At this time, the AP may determine that the terminal needs to perform the network switching.

It should be noted that, in embodiments of the present disclosure, the AP may determine the communication quality of the wireless local area network based on at least one of: a packet loss rate of data transmission between the AP and the terminal, a packet error rate of the data transmission between the AP and the terminal, and a current communication load of the AP. When the AP determines the communication quality of the wireless local area network based on the packet loss rate of the data transmission between the AP and the terminal, the communication quality of the wireless local area network is lower than the first quality threshold: the packet loss rate is greater than a first threshold. When the AP determines the communication quality of the wireless local area network based on the packet error rate of the data transmission between the AP and the terminal, the communication quality of the wireless local area network is lower than the first quality threshold: the packet error rate is greater than a second threshold. When the AP determines the communication quality of the wireless local area network based on its current communication load, the communication quality of the wireless local area network is lower than the first quality threshold: the communication load is greater than a third threshold. It should be noted that the first threshold, the second threshold, and the third threshold may be set by a technician in advance, which are not specifically limited in the embodiment of the present disclosure.

Certainly, there may be other methods for determining the communication quality of the wireless local area network in a practical application, which will be omitted herein by the embodiment of the present disclosure.

In step 306, when the AP determines that the terminal needs to perform the network switching, the AP determines a candidate cellular communication network within an intersection between the type of the cellular communication network detected by the wireless access point and the type of a cellular communication network supported by the terminal can be selected to establish the communication connection.

As described above, when the AP determines that the terminal needs to perform the network switching, the AP may control the terminal to perform the network switching according to the information of the cellular communication network detected by the AP. In a practical application, the cellular communication network detectable by the AP is not necessarily the cellular communication network supported by the terminal. Therefore, before controlling the terminal to perform the network switching according to the information of the detected cellular communication network, the AP needs to determine the candidate cellular communication networks, each of the candidate cellular communication networks is a cellular communication network supported by the terminal, and is further a cellular communication network detectable by the AP, in this way, the AP may select one eligible cellular communication network from the candidate cellular communication networks and control the terminal to switch to the eligible cellular communication network.

In some embodiments of the present disclosure, a technical process for an AP to acquire candidate the cellular communication network may be as follows:

The AP acquires the cellular communication network detectable by the AP, that is, the AP acquires the cellular communication network corresponding to the network information, and meanwhile, the AP may acquire the cellular communication network supported by the terminal, and then the AP may determine the intersection between the cellular communication network detectable by the AP and the cellular communication network supported by the terminal, and the obtained cellular communication network set includes the candidate cellular communication networks described above. Certainly, after determining the intersection, the AP may further select some cellular communication networks from the obtained cellular communication network set to form the candidate cellular communication networks, for example, when the number of the cellular communication networks in the cellular communication network set is greater than a threshold, the AP may select the cellular communication networks the quantity of which is equal to the threshold to form the candidate cellular communication networks, which is not specifically limited in embodiments of the present disclosure.

For example, the cellular communication network corresponding to the network information includes GSM, CDMA, WCDMA, and TD-LTE, and the cellular communication network supported by the terminal includes WCDMA and TD-LTE, and then the intersection operation is performed on "GSM, CDMA, WCDMA, and TD-LTE" and "WCDMA and TD-LTE", and the obtained cellular communication network set includes "WCDMA and TD-LTE", and the cellular communication network set "WCDMA and TD-LTE" includes the candidate cellular communication networks.

It should be noted that, when the AP determines that the terminal does not need to be subjected to network switching, the step 305 may be performed again in embodiments of the present disclosure.

In step 307, the AP determines a target cellular communication network of the candidate cellular communication networks.

As described above, after determining the candidate cellular communication networks, the AP may select an eligible cellular communication network from the candidate cellular communication networks, and control the terminal to switch to the eligible cellular communication network, wherein the eligible cellular communication network is the target cellular communication network described above. Hereinafter, the embodiments of the present disclosure will briefly describe a technical process for an AP to select the target cellular communication network from the candidate cellular communication networks.

The AP may acquire the communication quality of each cellular communication network of the candidate cellular communication networks, and determine any one cellular communication network, the communication quality of which is greater than a second quality threshold, of the candidate cellular communication networks as the target cellular communication network, or determine the cellular communication network having the highest communication quality and the communication quality greater than a second quality threshold in the candidate cellular communication networks as the target communication network.

The AP may determine the communication quality of the corresponding cellular communication network based on the strength of a communication signal of each cellular communication network of the candidate cellular communication networks, in which case, the communication quality of the cellular communication network is greater than the second quality threshold: the strength of the communication signal of the cellular communication network is greater than a strength threshold. In a practical application, the strength threshold may be set by a technician in advance, which is not specifically limited in the embodiment of the present disclosure.

As exemplified above, the candidate cellular communication networks may be "WCDMA and TD-LTE", and the AP may detect the strength of communication signals of the WCDMA and the TD-LTE, and the obtained communication signals are as shown in Table 1.

TABLE 1

|  | WCDMA | TD-LTE |
|---|---|---|
| Strength of communication signals | −60 db | −50 db |

As can be seen from Table 1, the strength of the communication signal of the TD-LTE is greatest, and is greater than a strength threshold −55 db. Therefore, the TD-LTE may be determined as the target cellular communication network.

In step 308, the AP transmits a network switching instruction to the terminal, wherein the network switching instruction is configured to instruct the terminal to switch to the target cellular communication network from the wireless local area network.

It can be seen from the description of the step 307 that the communication quality of the target cellular communication network is greater than the second quality threshold, that is, the communication quality of the target cellular communication network is high. Therefore, performing network switching on the terminal may ensure that the terminal switches to the target cellular communication network with higher communication quality from the wireless local area network with poorer communication quality, thereby ensuring that the terminal may perform data transmission after performing the network switching, and improving the data transmission efficiency of the terminal. In this case, the AP may transmit a network switching instruction to the terminal.

In step 309, the terminal receives the network switching instruction transmitted by the AP, and switches to the target cellular communication network from the wireless local area network after receiving the network switching instruction.

In summary, the wireless communication method provided by the embodiment of the present disclosure includes the following steps: the network information of the cellular communication network perceived by the wireless access point is transmitted to the terminal by the wireless access point, wherein the network information may indicate the type of the cellular communication network perceived by the wireless access point, so that the terminal can determine the type of the cellular communication network detectable by the wireless access point according to the network information; and the wireless access point which supports a type of a cellular communication network within an intersection between the type of the cellular communication network detected by the wireless access point and the type of a cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

Further, when the terminal needs to perform the network switching, the wireless access point may determine, according to the information of the detected cellular communication network, whether the terminal could perform data transmission through the cellular communication network after switching to the cellular communication network, and controls the terminal to perform the network switching after determining that the terminal may perform data transmission through the cellular communication network after switching to the cellular communication network, thereby ensuring that the terminal may smoothly perform data transmission after being subjected to network switching, and further improving the reliability of performing network switching on the terminal.

Figure 4:
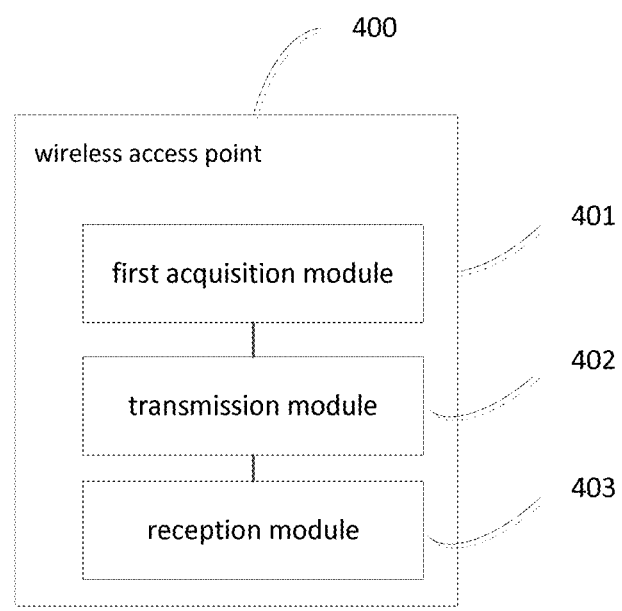
FIG. 4 illustrates a block diagram of a wireless access point according to embodiments of the present disclosure.
Figure 5:
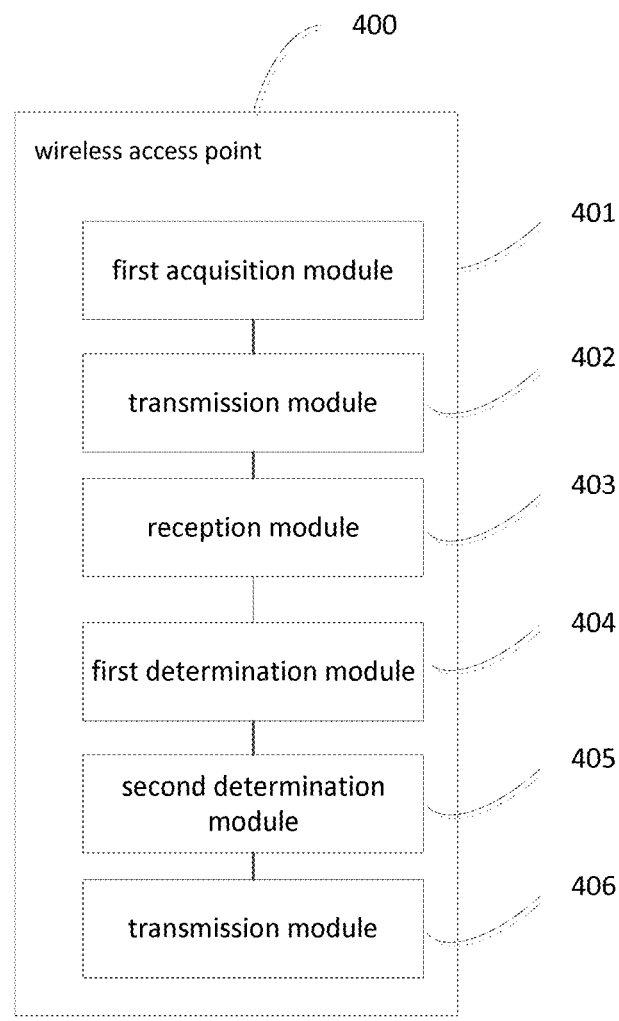
FIG. 5 illustrates a block diagram of a wireless access point according to embodiments of the present disclosure.

FIG. 4 illustrates a block diagram of a wireless access point 400 according to embodiments of the present disclosure. With reference to FIG. 4, the wireless access point 400 includes a first acquisition module 401, a transmission module 402 and a reception module 403.

The first acquisition module 401 is configured to acquire network information of a cellular communication network perceived by the AP, wherein the network information is configured to indicate a type of the cellular communication network perceived by the AP.

The transmission module 402 is configured to transmit the network information to the terminal.

The reception module 403 is configured to receive a connection establishment request transmitted by the terminal, wherein the connection establishment request is transmitted by the terminal when an intersection between a type of the cellular communication network indicated by the network information and a type of a cellular communication network supported by the terminal exists.

In embodiments of the present disclosure, the transmission module 402 is configured to transmit a management frame to the terminal, wherein the management frame carries the network information.

In embodiments of the present disclosure, the network information includes a network mode of the cellular communication network. The network information further includes at least one of an identifier of the base station and a load of the base station. The network mode includes a GSM network mode, a CDMA network mode, a CDMA2000 network mode, a WCDMA network mode, a TD-SCDMA network mode, a TD-LTE network mode or a FDD-LTE network mode.

Embodiments of the present disclosure further provide another wireless access point 500. The wireless access point 500 includes a first determination module 404, a second determination module 405, a transmission module 406 and a second acquisition module 407 in addition to the modules included in the wireless access point 400.

The first determination module 404 is configured to determine, when a network switching is required, a candidate cellular communication network within an intersection between the type of the cellular communication network detected by the wireless access point and the type of a cellular communication network supported by the terminal can be selected to establish the communication connection.

The second determination module 405 is configured to determine a target cellular communication network in the candidate cellular communication network.

The transmission module 406 is configured to transmit a network switching instruction to the terminal, wherein the network switching instruction is configured to instruct the terminal to switch to the target cellular communication network from the wireless local area network.

The second acquisition module 407 is configured to acquire the communication quality of the wireless local area network that the AP connects.

The first determination module 404 is further configured to determine that the network switching is required when the communication quality of the wireless local area network is lower than a first quality threshold.

In some embodiments of the present disclosure, the second acquisition module 407 is configured to:

determine a communication quality of the wireless local area network that the AP connects based on at least one of: a packet loss rate of data transmission between the AP and the terminal, a packet error rate of the data transmission between the AP and the terminal, and a current communication load of the AP.

In some embodiments of the present disclosure, the second determination module 405 is configured to:

acquire a communication quality of each cellular communication network in the candidate cellular communication networks;

determine, in the candidate cellular communication networks, any one cellular communication network having a communication quality greater than a second quality threshold as the target cellular communication network;

or, determine, in the candidate cellular communication networks, the cellular communication network having the highest communication quality and a communication quality greater than a second quality threshold as the target communication network.

In some embodiments of the present disclosure, the second determination module 405 is configured to:

determine the communication quality of the corresponding cellular communication network based on the strength of a communication signal of each cellular communication network in the candidate cellular communication network.

In summary, the wireless access point provided by the embodiment of the present disclosure transmits the network information of the cellular communication network perceived by the wireless access point, wherein the network information may indicate the type of the cellular communication network, so that the terminal can determine the type of the cellular communication network detectable by the wireless access point according to the network information; and the wireless access point which supports a type of a cellular communication network within an intersection between the type of the cellular communication network detected by the wireless access point and the type of the cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

With regard to the apparatus in the above embodiments, a specific manner in which the respective modules perform operations has been described in detail in the embodiments related to the method, and will not be explained in detail herein.

Figure 6:
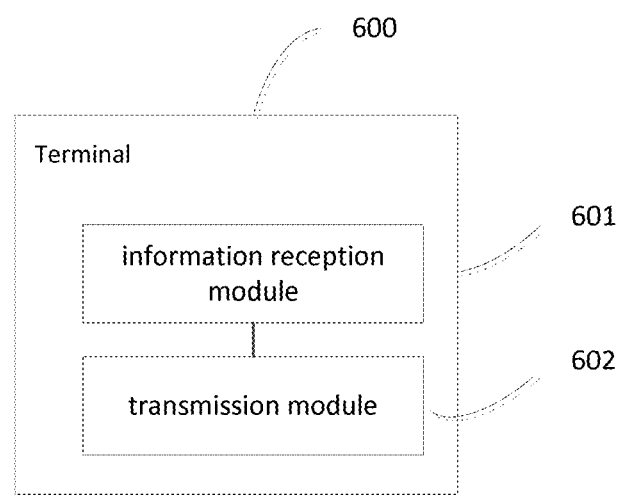
FIG. 6 illustrates a block diagram of a terminal according to embodiments of the present disclosure.
Figure 7:
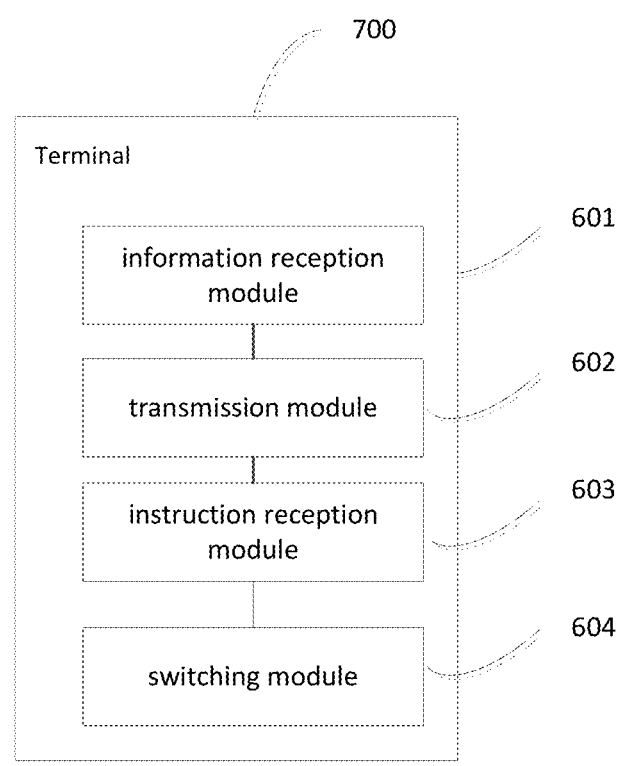
FIG. 7 illustrates a block diagram of a terminal according to embodiments of the present disclosure.

FIG. 6 illustrates a block diagram of a terminal 600 according to embodiments of the present disclosure. With reference to FIG. 6, the terminal 600 includes an information reception module 601 and a transmission module 602.

The information reception module 601 is configured to receive network information transmitted by the AP, wherein the network information is configured to indicate the type of the cellular communication network perceived by the AP.

The transmission module 602 is configured to transmit a connection establishment request to the AP when an intersection between a type of the cellular communication network indicated by the network information and a type of a cellular communication network supported by the terminal exists, wherein the connection establishment request is configured to instruct the AP to establish a communication connection with the terminal.

In some embodiments of the present disclosure, the information reception module 601 is configured to receive a management frame transmitted by an AP, wherein the management frame carries the network information.

In some embodiments of the present disclosure, the network information includes a network mode of the cellular communication network. The network information further includes at least one of: an identifier of a base station and a load of the base station. The network mode includes a GSM network mode, a CDMA network mode, a CDMA2000 network mode, a WCDMA network mode, a TD-SCDMA network mode, a TD-LTE network mode or a FDD-LTE network mode.

Embodiments of the present disclosure further provide another terminal 700. The terminal 700 includes an instruction reception module 603 and a switching module 604 in addition to the modules included in the terminal 600.

The instruction reception module 603 is configured to receive a network switching instruction transmitted by the AP, wherein the network switching instruction is configured to instruct the terminal to be switched to a target cellular communication network from a wireless local area network, the target cellular communication network is a cellular communication network of the candidate cellular communication networks, and the candidate cellular communication networks are an intersection of the cellular communication network perceived by the AP and the cellular communication network supported by the terminal.

The switching module 604 is configured to switch from the wireless local area network to the target cellular communication network after receiving the network switching instruction.

In summary, the terminal provided by the embodiment of the present disclosure receives the network information, which is transmitted by the wireless access point, of the cellular communication network perceived by the wireless access point, wherein the network information may indicate the type of the cellular communication network, so that the terminal can determine the type of the cellular communication network detectable by the wireless access point according to the network information; and the wireless access point which supports a type of a cellular communication network within an intersection between the type of the cellular communication network detected by the wireless access point and the type of the cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

With regard to the apparatus in the above embodiments, a specific manner in which the respective modules perform operations has been described in detail in the embodiment related to the method, and will not be explained in detail herein.

Figure 8:
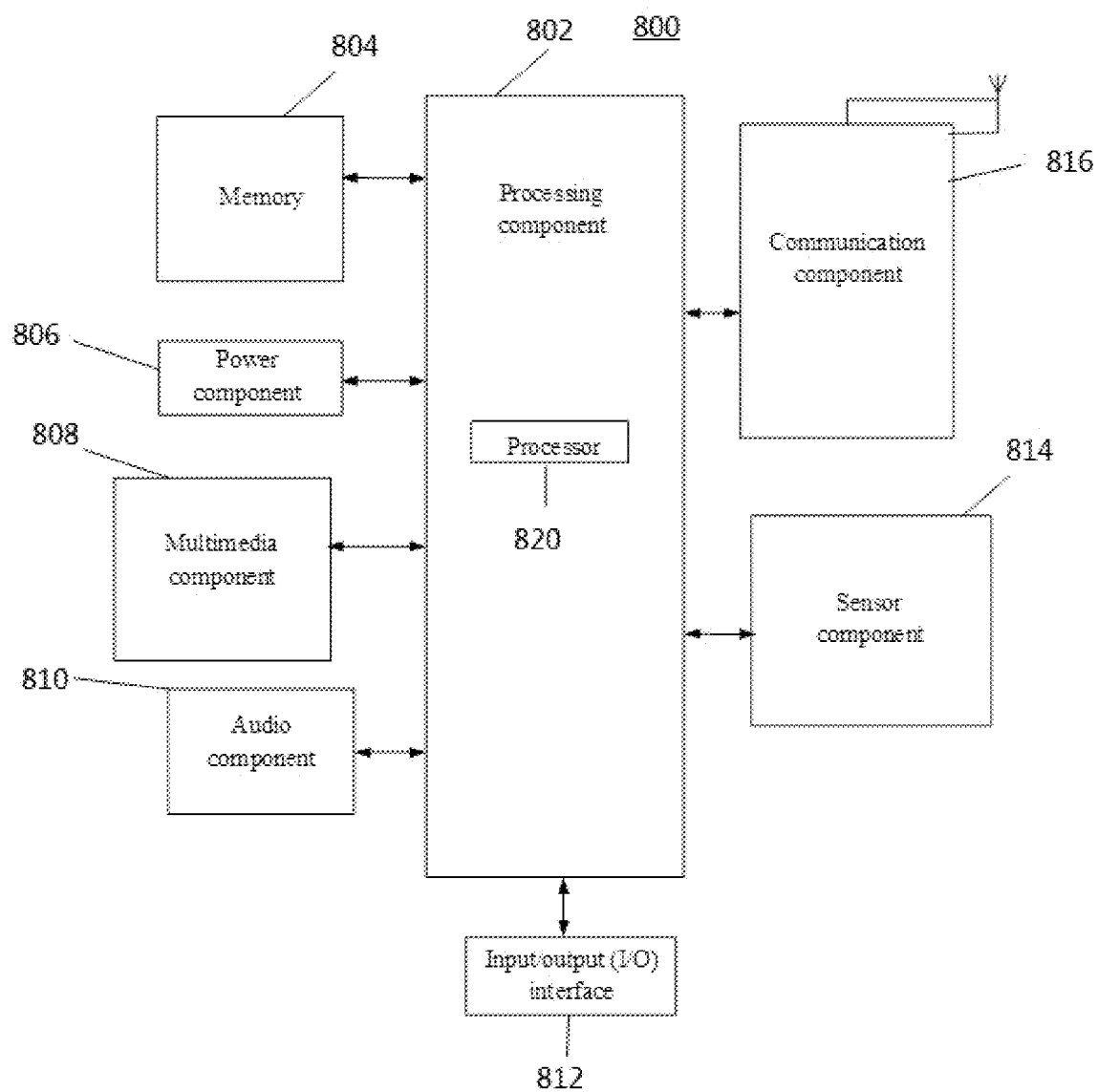
FIG. 8 illustrates a block diagram of a terminal according to embodiments of the present disclosure.

FIG. 8 is a block diagram of a terminal 800 in accordance with embodiments of the present disclosure. For example, the terminal 800 may be a mobile phone, a computer, a digital broadcast terminal, a messaging device, a gaming console, a tablet device, a medical device, a fitness equipment, a personal digital assistant, and the like Referring to FIG. 8 the terminal 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls the overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, videos, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 808 includes a front camera and/or a rear camera. The front camera and the rear camera may receive external multimedia data while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive external audio signals when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a start button, and a lock button.

The sensor component 814 includes one or more sensors to provide status assessments of various aspects of the apparatus 800. For instance, the sensor component 814 may detect an on/off status of the apparatus 800, relative positioning of components, e.g., the display device and the mini keyboard of the apparatus 800, and the sensor component 814 may also detect a position change of the terminal 800 or a component of the apparatus 800, presence or absence of user contact with the apparatus 800, orientation or acceleration/deceleration of the apparatus 800, and temperature change of the apparatus 800. The sensor component 814 may include a proximity sensor configured to detect the presence of nearby objects without any physical contact. The sensor component 814 may also include a light sensor, such as a CMOS or CCD image sensor, used for imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In embodiments of the present disclosure, the communication component 816 receives broadcast signals or broadcast associated information from an external broadcast management system via a broadcast channel. In embodiments of the present disclosure, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments of the present disclosure, there is further provided a non-transitory computer-readable storage medium including an instruction, for example, a memory 804 including an instruction, wherein the instruction is executable by a processor 820 of a terminal 800 to perform the above method. For example, the non-transitory computer-readable storage medium may be a ROM, a random-access memory (RAM), a CD-ROM, a magnetic tape, a floppy disk and an optical data storage device.

Figure 9:
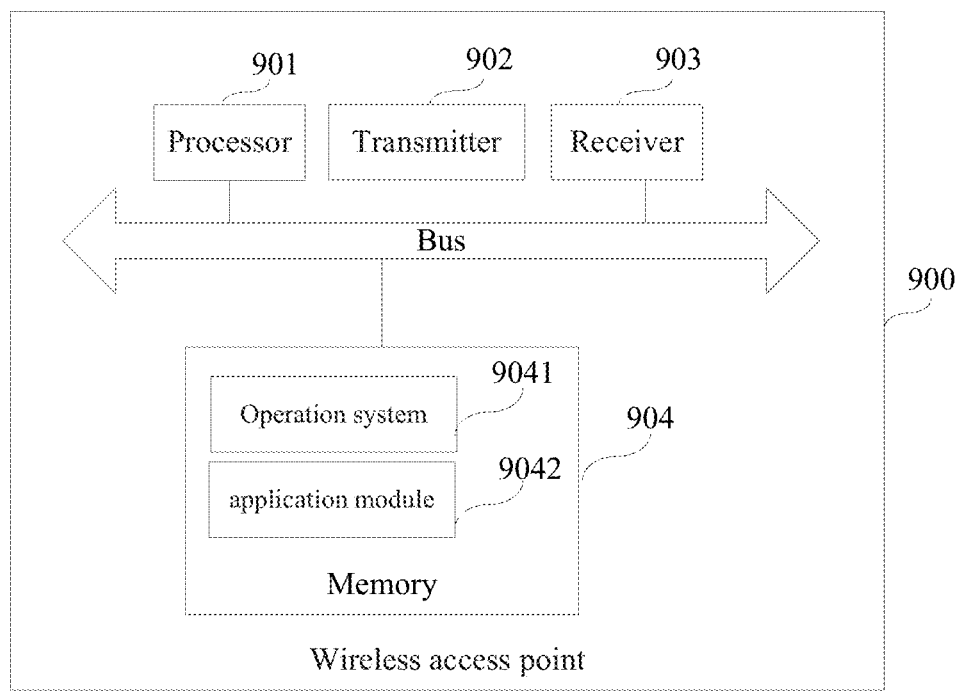
FIG. 9 illustrates a block diagram of a wireless access point according to embodiments of the present disclosure.

FIG. 9 illustrates a block diagram of a wireless access point 900 according to embodiments of the present disclosure. As shown in FIG. 9, the wireless access point 900 may include a processor 901, a receiver 902, a transmitter 903 and a memory 904. The receiver 902, the transmitter 903 and the memory 904 are connected with the processor 901 via a bus, respectively.

The processor 901 includes one or more processing cores. The processor 901 executes the wireless communication method provided by the embodiments of the present disclosure by running a software program and a module. The memory 904 can be configured to store the software program and the module. Specifically, the memory 904 may store an operating system 9041 and an application module 9042 required by at least one function. The receiver 902 is configured to receive a communication message transmitted by other devices, and the transmitter 903 is configured to transmit the communication message to other devices.

In embodiments of the present disclosure, there is further provided a computer-readable storage medium in which a computer program is stored. When the computer program in the computer-readable storage medium is executed by a processor, a wireless communication method may be performed. For example, the method may include: network information of a cellular communication network perceived by an AP is acquired, wherein the network information is configured to indicate a type of the cellular communication network; the network information is transmitted to the terminal; and a connection establishment request transmitted by the terminal is received, wherein the connection establishment request is transmitted by the terminal when there is an intersection between the type, which is indicated by the network information, of the cellular communication network and a type of a cellular communication network supported by the terminal. Alternatively, the method may include: network information transmitted by an AP is received, wherein the network information is configured to indicate the type of the cellular communication network perceived by the AP; and when there is an intersection between the type, which is indicated by the network information, of the cellular communication network and a type of a cellular communication network supported by the terminal, a connection establishment request is transmitted to the AP, wherein the connection establishment request is configured to instruct the AP to establish a communication connection with the terminal.

The technical solution provided by the embodiments of the present disclosure may lead the following beneficial effects.

the network information of the cellular communication network perceived by the wireless access point (AP) is transmitted to the terminal by the wireless access point, wherein the network information may indicate the type of the cellular communication network perceived by the wireless access point, so that the terminal may acquire the type of the cellular communication network perceived by the wireless access point according to the network information; and the wireless access point which supports a type of a cellular communication network within an intersection between the type of the cellular communication network detected by the wireless access point and the type of the cellular communication network supported by the terminal can be selected to establish the communication connection, so that the possibility of acquiring information of the cellular communication network to which the terminal is to be switched is increased when network switching is performed, thereby increasing the probability of performing valid network switching on the terminal, and further improving the reliability of performing network switching on the terminal.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A wireless communication method, applied to a wireless access point (AP), comprising:
   acquiring network information of a cellular communication network detected by the AP, wherein the network information indicates an AP type cellular communication network, wherein the AP type cellular communication network indicates the cellular communication network that the AP has detected;
   transmitting the network information to a terminal;
   receiving a connection establishment request transmitted by the terminal, wherein the connection establishment request is transmitted when there is an intersection between the AP type cellular communication network and a terminal supported cellular communication network, wherein the terminal supported cellular communication network is a cellular communication network that is supported by the terminal, wherein the connection establishment request is configured to instruct the AP to establish a communication connection with the terminal;
   determining candidate cellular communication networks, wherein the candidate cellular communication networks are AP type cellular communication networks that intersect terminal supported cellular communication networks;
   determining a target cellular communication network in the candidate cellular communication networks, wherein communication quality of the target cellular communication network is greater than a second quality threshold; and
   transmitting a network switching instruction to the terminal, wherein the network switching instruction is configured to instruct the terminal to switch to the target cellular communication network from a wireless local area network when the communication quality of the target cellular communication network is greater than the second quality threshold.

2. The method according to claim 1, wherein transmitting the network information to the terminal comprises:
   transmitting a management frame to the terminal, wherein the management frame carries the network information.

3. The method according to claim 1, further comprising:
   acquiring a communication quality of an AP wireless local area network, wherein the AP wireless local area network is a wireless local area network that the AP is connected to; and
   determining that network switching is required when the communication quality of the AP wireless local area network is lower than a first quality threshold.

4. The method according to claim 3, wherein acquiring a communication quality of the AP wireless local area network comprises:
   acquiring the communication quality of the AP wireless local area network based on at least one of: a packet loss rate of data transmission between the AP and the terminal, a packet error rate of the data transmission between the AP and the terminal, and a current communication load of the AP.

5. The method according to claim 1, wherein the determining the target cellular communication network in the candidate cellular communication network comprises:
   acquiring a communication quality for each of the candidate cellular communication networks; and
   determining the target cellular communication network based on which candidate cellular communication network either:
   has a communication quality greater than a second quality threshold, or
   has the highest communication quality and its communication quality is greater than a second quality threshold.

6. The method according to claim 5, wherein the acquiring a communication quality for each of the candidate cellular communication networks comprises:
   determining the communication quality of each of the candidate cellular communication networks based on each of their signal strength.

7. The method according to claim 1, wherein the network information further comprises a mode of the cellular communication network, and at least one of: an identifier of a base station and a load of the base station.

8. The method according to claim 7, wherein the network system comprises a GSM network mode, a CDMA network mode, a CDMA2000 network mode, a WCDMA network mode, a TD-SCDMA network mode, a TD-LTE network mode, or a FDD-LTE network mode.

9. A wireless communication method, applied to a terminal, comprising:
   receiving network information transmitted by a wireless access point (AP), wherein the network information is configured to indicate an AP type cellular communication network, wherein the AP type cellular communication network is the cellular communication network that the AP has detected; and
   transmitting a connection establishment request to the AP when there is an intersection between the AP type cellular communication network and the terminal supported cellular communication network, wherein the terminal supported cellular communication network is a cellular communication network supported by the terminal, wherein the connection establishment request is configured to instruct the AP to establish a communication connection with the terminal, wherein the connection establishment request is configured to instruct the AP to establish a communication connection with the terminal;
   receiving a network switching instruction transmitted by the AP, wherein the network switching instruction is configured to instruct the terminal to switch to a target cellular communication network from a wireless local area network, wherein the target cellular communication network is an AP type cellular communication network that intersects a supported cellular communication network, and communication quality of the target cellular communication network is greater than a second quality threshold;

switching, after receiving the network switching instruction when the communication quality of the target cellular communication network is greater than the second quality threshold, to the target cellular communication network from the wireless local area network.

10. The method according to claim 9, wherein receiving the network information transmitted by the AP comprises:
receiving a management frame transmitted by the AP, wherein the management frame carries the network information.

11. The method according to claim 9, wherein the network information further comprises a network mode of the cellular communication network, and at least one of: an identifier of a base station and a load of the base station.

12. A wireless access point, comprising:
one or more processors;
tangible, non-transitory computer-readable memory, which is configured to store an instruction executable by the one or more processors;
wherein the one or more processors are configured to:
acquire network information of a cellular communication network detected by a wireless access point (AP), wherein the network information is configured to indicates an AP type cellular communication network, wherein the AP type cellular communication network is the cellular communication network that the AP has detected;
transmit the network information to a terminal; and
receive a connection establishment request transmitted by the terminal, wherein the connection establishment request is transmitted when there is an intersection between the AP type cellular communication network and a terminal supported cellular communication network, wherein the terminal supported cellular communication network is a communication network supported by the terminal, wherein the connection establishment request is configured to instruct the AP to establish a communication connection with the terminal;
determining candidate cellular communication networks, wherein the candidate cellular communication networks are AP type cellular communication networks that intersect terminal supported cellular communication networks;
determining a target cellular communication network in the candidate cellular communication networks, wherein communication quality of the target cellular communication network is greater than a second quality threshold; and
transmitting a network switching instruction to the terminal, wherein the network switching instruction is configured to instruct the terminal to switch to the target cellular communication network from a wireless local area network when the communication quality of the target cellular communication network is greater than the second quality threshold.

13. The method according to claim 11, wherein the network system comprises a GSM network mode, a CDMA network mode, a CDMA2000 network mode, a WCDMA network mode, a TD-SCDMA network mode, a TD-LTE network mode, or a FDD-LTE network mode.

14. The AP according to claim 12, wherein the transmitting the network information to the terminal comprises:
transmitting a management frame to the terminal, wherein the management frame carries the network information.

15. The AP according to claim 12, wherein the one or more processors are further configured to:
acquiring a communication quality of an AP wireless local area network, wherein the AP wireless local area network is a wireless local are network that the AP is connected to; and determining that network switching is required when the communication quality of the AP wireless local area network is lower than a first quality threshold.

16. The AP according to claim 15, wherein acquiring a communication quality of the AP wireless local area network comprises:
acquiring the communication quality of the AP wireless local area network based on at least one of: a packet loss rate of data transmission between the AP and the terminal, a packet error rate of the data transmission between the AP and the terminal, and a current communication load of the AP.

17. The AP according to claim 12, wherein the determining the target cellular communication network in the candidate cellular communication network comprises:
acquiring a communication quality for each of the candidate cellular communication networks; and
determining the target cellular communication network based on which candidate cellular communication network either:
has a communication quality greater than a second quality threshold, or
has the highest communication quality and its communication quality is greater than a second quality threshold.

18. The AP according to claim 17, wherein the acquiring a communication quality for each of the candidate cellular communication networks comprises:
determining the communication quality of each of the candidate cellular communication networks based on each of their signal strength.

19. The AP according to claim 12, wherein the network information further comprises a mode of the cellular communication network, and at least one of: an identifier of a base station and a load of the base station.

20. The method according to claim 19, wherein the network system comprises a GSM network mode, a CDMA network mode, a CDMA2000 network mode, a WCDMA network mode, a TD-SCDMA network mode, a TD-LTE network mode, or a FDD-LTE network mode.

* * * * *